United States Patent Office 2,851,400
Patented Sept. 9, 1958

2,851,400
PROCESS OF TREATING HYDROCRACKING CATALYSTS WITH AMMONIA

John W. Myers and Lloyd C. Mabry, Jr., Bartlesville, Okla., assignors to Phillips Petroleum Company, a corporation of Delaware No Drawing. Application August 24, 1953
Serial No. 376,232

28 Claims. (Cl. 196—53)

This invention relates to a method for activating a hydrocracking catalyst to improve activity for hydrocracking hydrocarbons, to the catalyst activated by the process, and to a process for hydrocracking hydrocrackable hydrocarbons in contact with said catalyst.

Hydrocracking processes are commonly employed on heavy residual or distillate oils for the production of substantial yields of low boiling saturated products, such as gasoline, intermediate distillates which may be utilized as domestic fuels and, to some extent, heavier cuts suitable for use as lubricants. In these hydrocracking processes, cracking and hydrogenation reactions take place simultaneously. Hydrocracking, as distinguished from simple hydrogenation wherein only the addition of hydrogen to unsaturated bonds takes place, is cracking under hydrogenating conditions so that products of the cracking reaction are substantially more saturated than when hydrogen or materials supplying hydrogen are not present. A very effective catalyst for hydrocracking reactions is one comprising iron oxide in combination with an oxide of a metal selected from groups 5A or 6A of the periodic table, particularly molybdenum trioxide, supported on a carrier material of alumina or silica-alumina. This catalyst, while quite effective, leaves room for improvement as to the degree of activity, effective life, efficiency, per-pass conversion rate, stability to regeneration, and the like.

The principal object of the invention is to provide an activation process for a hydrocracking catalyst which produces an improved catalyst having increased activity for the hydrocracking of hydrocarbons. Another object of the invention is to provide an improved hydrocracking catalyst having increased activity for hydrocracking hydrocarbons. A further object is to provide an improved process for hydrocracking hydrocrackable hydrocarbons. Other objects of the invention will become apparent from a consideration of the accompanying disclosure.

In accordance with the invention, an improved hydrocracking catalyst having increased activity in the hydrocracking of hydrocarbons is prepared by subjecting a catalyst composite containing ferric oxide and at least one metal oxide selected from groups 5A and 6A of the periodic table, particularly molybdenum trioxide, supported on a carrier material of alumina or silica-alumina, to the action of a hydrogen-containing atmosphere and an ammonia atmosphere at elevated temperatures in the range of 950° to 1300° F. for a period of at least one-half hour and sufficient to improve the activity of the catalyst over that of a catalyst composite containing the same initial constituents or components which has not been subjected to these activation steps.

The activation treatment preferably comprises contacting the catalyst, at an elevated temperature, first with an atmosphere comprising predominantly free hydrogen devoid of catalyst poisons and following this treating step immediately, or very shortly, with a second contacting step wherein the hydrogen-treated catalyst is heated in an ammonia-containing ambient at a temperature in the range of 950° to 1300° F. for at least one-half hour. The reversed order of the treating steps also effects desired activation of the catalyst, as does simultaneous treatment with the treating gases. It is also feasible to activate the catalyst by treatment with ammonia, alone, under the required conditions, but catalysts activated by these modifications of the invention are generally not so active as those activated by heating in hydrogen followed by heating in ammonia.

The activation treatment of the invention is applicable to catalyst composites containing iron oxide in admixture with any combination of the metal oxides of groups 5A and 6A, preferably when deposited on, or in intimate admixture with, a carrier or support, preferably alumina, alone, or in admixture with silica. All reasonable proportions of the catalyst components are amenable to activation by the process of the invention; however, it is preferred to utilize iron oxide in the range of 0.5 to 20 weight percent and one or more of the metal oxides of groups 5A and 6A in the range of 2 to 30 weight percent, supported on an alumina-containing carrier which also desirably contains silica. When utilizing more than one of the selected metal oxides of groups 5A and 6A, it is preferred to restrict the total content of these oxides to the range specified so that the carrier material forms at least 50 percent of the weight of the total composite. Supports which are effective in the composite catalyst include natural and synthetic aluminas, silica-alumina prepared by coprecipitation or other methods conventional in the art, halogen-treated alumina, and activated bauxite, either raw or acid-treated. A preferred specific catalyst composition consists essentially of 1.5 weight percent ferric oxide, 10.6 weight percent molybdenum trioxide, 4.4 weight percent silica, and 83.5 weight percent alumina.

The catalyst composite which is to be activated in accordance with the activation treatment of the invention may be manufactured by any of the conventional methods utilized for preparing composite catalysts of this type. A suitable method is to impregnate prepared silica-alumina pellets with an iron salt decomposable to the oxide and subsequently impregnating the iron oxide-containing pellets with an aqueous salt solution of the other metal constituent or constituents which are to be incorporated into the composite. In incorporating molybdenum trioxide in the composite, a suitable impregnating solution is aqueous ammonium molybdate.

The activation of the catalyst in the treating agents is usually performed under similar conditions for each gaseous ambient, but different conditions may be employed, if desired, so long as the catalyst composite is heated at a temperature in the range of 950° to 1300° F. for one-half hour or longer in each treating agent. In activating the catalyst by heating in a gaseous ambient containing both treating agents, the activation period required is not materially increased. Although the treating is expedited by an increase in temperature, a temperature only slightly above the initial operating temperature of the hydrocracking step is preferred, since the subsequent cooling time is proportionally decreased. If desired, temperatures up to the temperature at which deterioration of the catalyst commences may be utilized. The pressure of the hydrogen and ammonia may be any that is convenient, such as atmospheric or higher. Both the hydrogen and ammonia atmospheres should be relatively pure and free from catalyst poisons, although minor proportions of relatively difficultly adsorbable compounds such as methane or nitrogen can be tolerated. The activation period required is at least one-half hour and depends principally upon the temperature at which activation is effected and to a lesser degree, upon the composition of the catalyst. The optimum period of activation for a given catalyst under specific conditions of temperature and pressure can readily be determined by trial.

The novel catalysts of the invention are highly advantageous in effecting the hydrocracking of hydrocarbon fractions amenable to hydrocracking and the reaction conditions of temperature, pressure, and flow rate may be within conventional ranges such as 800° to 1200° F., 250 to 5000 p. s. i., 0.5 to 5.0 liquid hourly space velocity, and hydrogen flow of 100 to 5000 cubic feet per barrel of reactants. The catalyst may be regenerated by burning off the deposited coke in an oxygen-containing atmosphere whenever it becomes inactive in use. Activity is not fully restored, however, until the catalyst composite is again activated in accordance with the activation treatment of the invention.

The chemical and/or physical aspects of the catalyst of the invention after the activation treatment, which account for its increased activiy for hydrocracking hydrocarbons are unknown, but it is certain that some definite change in the character of the catalyst does occur when it is activated in hydrogen and ammonia at elevated temperatures, particularly when the activation treatment includes hydrogen treatment followed by ammonia treatment.

The following specific example is intended to illustrate the invention and is not to be interpreted as unduly limiting the same.

*Example*

A catalyst of a composition of 1.5 weight percent ferric oxide, 10.6 weight percent molybdenum trioxide, 4.4 weight percent silica, and 83.5 weight per cent alumina was prepared by impregnating commercially-available silica-alumina pills (Harshaw) with an aqueous ferric nitrate solution, drying and calcining the impregnated pills, impregnating the dried pills with an aqueous ammonium molybdate solution, and redrying and recalcining the impregnated pills. This catalyst was first treated with cylinder hydrogen at a temperature of 1100° F. for a period of 1.9 hours and then treated with cylinder ammonia at an initial temperature of 1100° F. and reduced to the initial hydrocracking temperature of 900° F. during a period of 1.8 hours. This treated catalyst was then used to hydrocrack cyclohexane at a temperature of 900° F. which increased to 1377° F. after 25 minutes, a pressure of 315 p. s. i. a., a liquid hourly space velocity of 1.05, and a hydrogen-hydrocarbon mol ratio of 6.4 to form an effluent gas containing 34 volume percent methane. In comparison, hydrocracking of cyclohexane with the same catalyst treated with only cylinder hydrogen at an initial temperature of 1100° F. reduced to 889° F. during a period of 1.8 hours resulted in the formation of an effluent gas containing about 0.4 volume percent methane. The reaction conditions in this run were a temperature of 889° F., a pressure of 315 p. s. i. a., a liquid hourly space velocity of 1.05 and a hydrogen/hydrocarbon mol ratio of 6.4.

We claim:

1. The process for activating a hydrocracking catalyst comprising iron oxide and at least one metal oxide of the group consisting of the oxides of Mo, Cr, W, U, and V deposited on a carrier or support which comprises heating said catalyst in a hydrogen-containing ambient free of catalyst poisons at a temperature in the range of 950° to 1300° F. for a period of at least one-half hour and also heating said catalyst in an ammonia-containing ambient free of catalyst poisons at a temperature in said range for a time in said period so as to increase the activity of said catalyst for hydrocracking hydrocarbons.

2. The process of claim 1 in which the catalyst contains molybdenum oxide.

3. The process of claim 1 in which the catalyst is first treated with hydrogen and thereafter with ammonia.

4. The process for activating a hydrocracking catalyst comprising ferric oxide and at least one metal oxide of the group consisting of oxides of Mo, Cr, W, U, and V deposited on a carrier or support which comprises heating said catalyst in an ammonia-containing ambient free of catalyst poisons at a temperature in the range of 950° to 1300° F. for a period of at least one-half hour so as to increase the activity of said catalyst for hydrocracking hydrocarbons.

5. A catalyst containing a minor amount of iron oxide and a minor amount of at least one metal oxide of the group consisting of the oxides of Mo, Cr, W, U, and V in intimate association with a carrier or support, said catalyst having been activated by the proces of claim 4.

6. A catalyst containing a minor amount of iron oxide and a minor amount of at least one metal oxide of the group consisting of the oxides of Mo, Cr, W, U, and V in intimate association with a carrier or support, said catalyst having been activated by the process of claim 1.

7. A catalyst containing a minor amount of iron oxide and a minor amount of at least one metal oxide of the group consisting of the oxides of Mo, Cr, W, U, and V in intimate association with a carrier or support, said catalyst having been activated by the process of claim 3.

8. The catalyst of claim 7 containing iron oxide in the range of 0.5 to 20 weight percent and at least one metal oxide of the group consisting of the oxides of Mo, Cr, W, U, and V in the range of 2 to 30 weight percent and the balance an alumina-containing carrier.

9. The catalyst of claim 7 containing iron oxide in the range of 0.5 to 20 weight percent and at least one metal oxide of the group consisting of the oxides of Mo, Cr, W, U, and V in the range of 2 to 30 weight percent and the balance an alumina-silica-containing carrier.

10. The catalyst of claim 7 containing iron oxide in the range of 0.5 to 20 weight percent, molybdenum oxide in the range of 2 to 30 weight percent, and the remainder silica-alumina.

11. A catalyst consisting essentially of 1.5 weight percent iron oxide, 10.6 weight percent molybdenum trioxide, 4.4 weight percent silica, and 83.5 weight percent alumina, said catalyst having been activated by the process of claim 3.

12. The catalyst of claim 8 containing chromium oxide.
13. The catalyst of claim 8 containing tungsten oxide.
14. The catalyst of claim 8 containing uranium oxide.
15. The catalyst of claim 8 containing vanadium oxide.

16. A process for hydrocracking a hydrocrackable hydrocarbon which comprises contacting said hydrocarbon under hydrocracking conditions with a catalyst containing iron oxide and at least one metal oxide of the group consisting of oxides of Mo, Cr, W, U, and V, said catalyst having been activated by the process of claim 1.

17. A process for hydrocracking a hydrocrackable hydrocarbon which comprises contacting said hydrocarbon under hydrocracking conditions with a catalyst containing iron oxide and at least one metal oxide of the group consisting of the oxides of Mo, Cr, W, U, and V, said catalyst having been activated by the process of claim 4.

18. A process for hydrocracking a hydrocrackle hydrocarbon which comprises contacting said hydrocarbon under hydrocracking conditions with a catalyst containing iron oxide and at least one metal oxide of the group consisting of oxides of Mo, Cr, W, U, and V, said catalyst having been activated by the process of claim 3.

19. The process of claim 18 in which the catalyst consists essentially of iron oxide in the range of 0.5 to 20 weight percent, molybdenum trioxide in the range of 2 to 30 weight percent, and the balance silica-alumina.

20. The process of claim 18 in which the catalyst contains chromium oxide in the range of 0.5 to 20 weight percent of the catalyst.

21. The process of claim 18 in which the catalyst contains tungsten oxide in the range of 0.5 to 20 weight percent of the catalyst.

22. The process of claim 18 in which the catalyst contains uranium oxide in the range of 0.5 to 20 weight percent of the catalyst.

23. The process of claim 18 in which the catalyst contains vanadium oxide in the range of 0.5 to 20 weight percent of the catalyst.

24. The process of claim 17 in which the catalyst contains molybdenum oxide in the range of 0.5 to 20 weight percent of the catalyst.

25. The process of claim 17 in which the catalyst contains chromium oxide in the range of 0.5 to 20 weight percent of the catalyst.

26. The process of claim 17 in which the catalyst contains tungsten oxide in the range of 0.5 to 20 weight percent of the catalyst.

27. The process of claim 17 in which the catalyst contains uranium oxide in the range of 0.5 to 20 weight percent of the catalyst.

28. The process of claim 17 in which the catalyst contains vanadium oxide in the range of 0.5 to 20 weight percent of the catalyst.

References Cited in the file of this patent

UNITED STATES PATENTS

| | | |
|---|---|---|
| 1,890,434 | Krauch et al. | Dec. 6, 1932 |
| 1,904,218 | Franceway | Apr. 18, 1933 |
| 2,487,564 | Layng | Nov. 8, 1949 |
| 2,708,180 | Fuener et al. | May 10, 1950 |
| 2,758,598 | Anhorn et al. | Aug. 14, 1956 |